United States Patent [19]

Fritzsche

[11] Patent Number: 4,684,412
[45] Date of Patent: Aug. 4, 1987

[54] CLEANING AND DRYING APPARATUS AND METHOD FOR THE RECIRCULATION SYSTEM OF A HIGH EFFICIENCY DEEP FAT FRYER

[75] Inventor: Donald E. Fritzsche, Chicago Heights, Ill.

[73] Assignee: Hobart Corporation, Troy, Ohio

[21] Appl. No.: 763,500

[22] Filed: Aug. 8, 1985

[51] Int. Cl.$^4$ .................................................. B08B 7/00
[52] U.S. Cl. ................................ 134/19; 210/DIG. 8; 210/184; 126/378; 165/119; 99/330; 99/408
[58] Field of Search ................. 210/167, 184, DIG. 8, 210/100; 126/378; 165/119; 134/19, 18; 99/408, 330

[56] References Cited

U.S. PATENT DOCUMENTS

| | | | |
|---|---|---|---|
| 3,573,861 | 4/1971 | Lecrone | 99/408 |
| 3,962,999 | 6/1976 | Rehm | 165/71 |
| 4,328,097 | 5/1982 | Whaley et al. | 210/DIG. 8 |
| 4,444,095 | 4/1984 | Anetsberger et al. | 210/DIG. 8 |
| 4,460,818 | 7/1984 | Anetsberger et al. | 99/408 |
| 4,487,691 | 12/1984 | Panora | 210/DIG. 8 |
| 4,603,622 | 8/1986 | Beck | 210/DIG. 8 |

Primary Examiner—Andrew H. Metz
Assistant Examiner—Sharon T. Cohen
Attorney, Agent, or Firm—William Weigl

[57] ABSTRACT

A fat recirculating system with an external, gas-heated heat exchanger for a deep fat fryer is disclosed. The use of such a system necessitates recirculation also of cleaning solution and rinse water through inaccessible plumbing of the recirculation system whenever fat is to be replaced. To remove residual water droplets from the plumbing after rinsing, a "dry cycle" is utilized. The dry cycle includes intermittent application of heating and cooling of the empty heat exchanger, resulting in a substantial reduction in start-up time when the fryer is refilled and operation again commenced.

17 Claims, 7 Drawing Figures

CLEANING AND DRYING APPARATUS AND METHOD FOR THE RECIRCULATION SYSTEM OF A HIGH EFFICIENCY DEEP FAT FRYER

BACKGROUND OF THE INVENTION

This invention relates to apparatus for frying foods and particularly to improved deep fat fryers wherein fat heated externally of the fryer vessel or tank is recirculated therethrough. The invention is discussed in and was developed in conjunction with the fryer invention of U.S. Pat. No. 4,487,691 issued to Robert Panora on Dec. 11, 1984, which patent is incorporated herein by reference.

Deep fat frying of foods such as potatoes, fish, meats, and pastries is performed by immersing the foods in a tank containing heated cooking oil or fat. Of considerable importance in such fryers are their systems for heating the fat and for maintaining its temperature uniformity and cleanliness.

Of as great importance is the fryer's productivity, not only during actual frying operation, but also in enabling quick start-up at the beginning of the day or whenever the unit has fat replaced during the day. This invention was specifically designed for the fat recirculation, external, heat-exchanger-type fryer illustrated in the aforementioned U.S. Pat. No. 4,487,691, and has considerably reduced its start-up time from what it had been prior to its incorporation into the design.

Accordingly, it is an object of the invention to provide quick start-up in a heat-exchanger-type fryer. This is accomplished by providing a novel cleaning and drying method and apparatus which eliminates what has been discovered to be a key factor causing long starting times. That factor was water left in the recirculation system from a previous rinse. The effect of that water was to create pump vapor lock when next starting the fryer, preventing or inhibiting fat recirculation. Not only was start-up delayed, but the potential of overheated fat standing unrecirculated in the heat exchanger could easily damage the fat and reduce its useful life.

Specifically, the invention has as a primary object the intermittent or pulsed operation of the burner for the heat exchanger, when it is theoretically empty after cleaning and flushing, but still contains residual rinse water therein, in order to flash off residual water droplets in a rapid and efficient manner without damage to the heat exchanger. By drying the heat exchanger internally immediately upon cleaning, start-up time upon replacement of the fat has been reduced considerably from what it was prior to introduction of the invention.

SUMMARY OF THE INVENTION

The invention is preferably associated with a high efficiency deep fat fryer having a fry tank from which cooking fat is continuously withdrawn by a pump and recirculated through an external heat exchanger, back to the tank.

The heating system for such a deep fat fryer includes a gas-fired burner for heating the heat exchanger. The heat exchanger comprises a tube positioned between the burner and the bottom of the fry tank and having ring-shaped external fins. The heat exchanger tube is preferably serpentine in form or in the shape of a helix having a tapered shape to expose maximum surface area to the combustion gases of the burner. With these heating systems the fryer provides a calorimetric efficiency of about 70-75 percent and flue exhaust temperatures as low as 350° F. when conducting tests with boiling water, both substantial improvements over the prior art.

The specific feature to which this invention is directed is a so-called "dry cycle", which enables relatively complete internal drying of the heat exchanger without damage thereto, thus permitting rapid start-up of the fryer when refilled and again started. The rapid start-up after the tank is refilled with fat is enabled by eliminating steam build-up in the heat exchanger and vapor lock potential in the pump as a result thereof. The heat exchanger is dried internally after cleaning by pulsing the burner on and off intermittently, to build up sufficient heat for drying the system while avoiding damage to the empty heat exchanger which might result from overheating while it is empty.

DESCRIPTION OF PREFERRED EMBODIMENT

Figure 1:
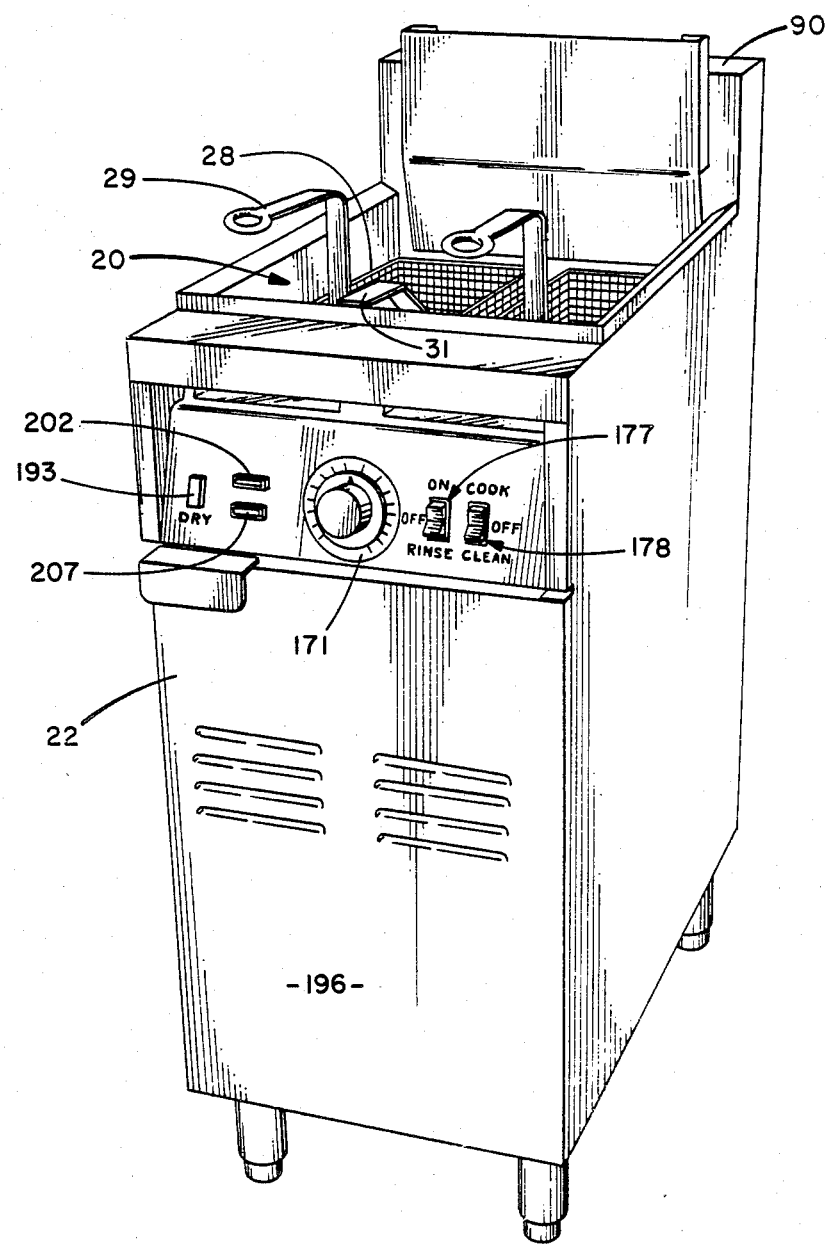
FIG. 1 is a view in perspective of a deep fat fryer embodying to the invention.
Figure 2:
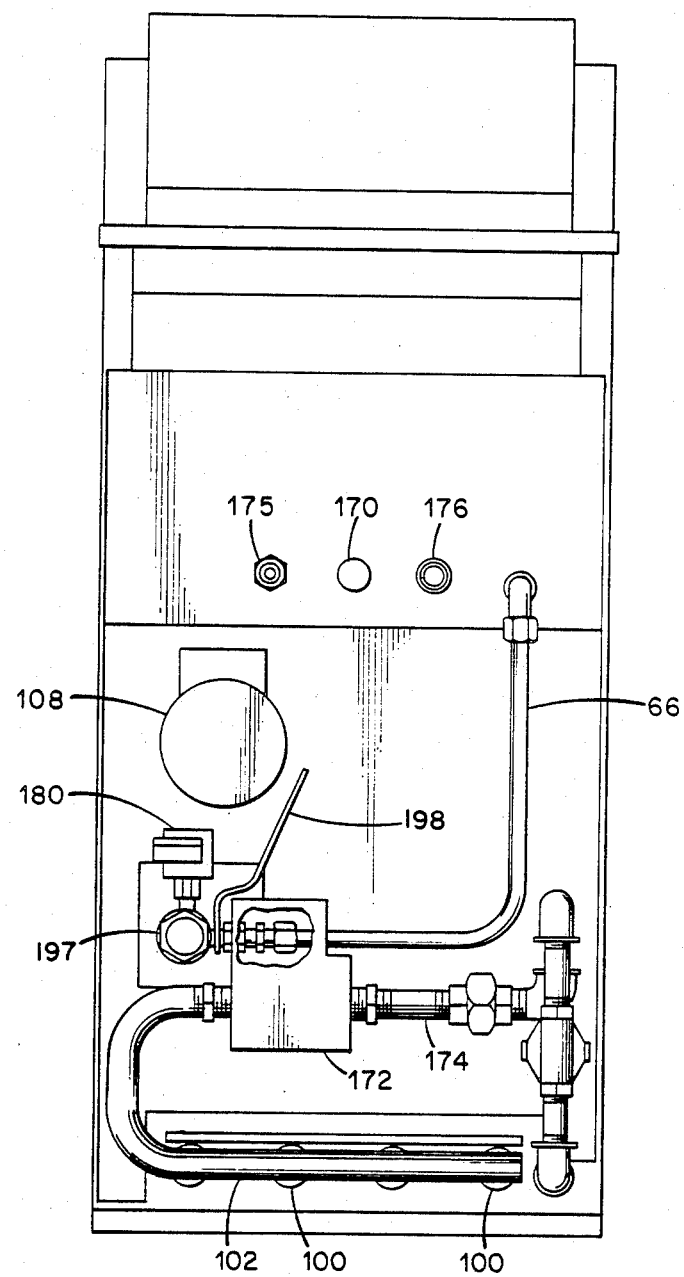
FIG. 2 is a front end view, partly broken away, of the fryer of FIG. 1.
Figure 3:
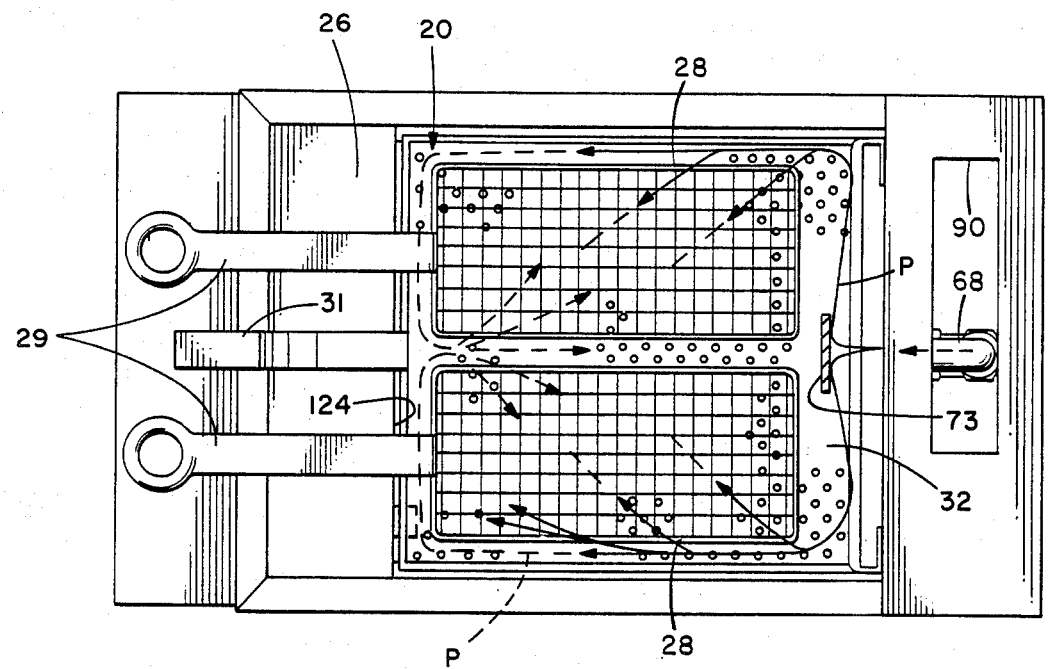
FIG. 3 is a top view of the fryer of FIGS. 1 and 2, looking down into a fry tank.
Figure 4:
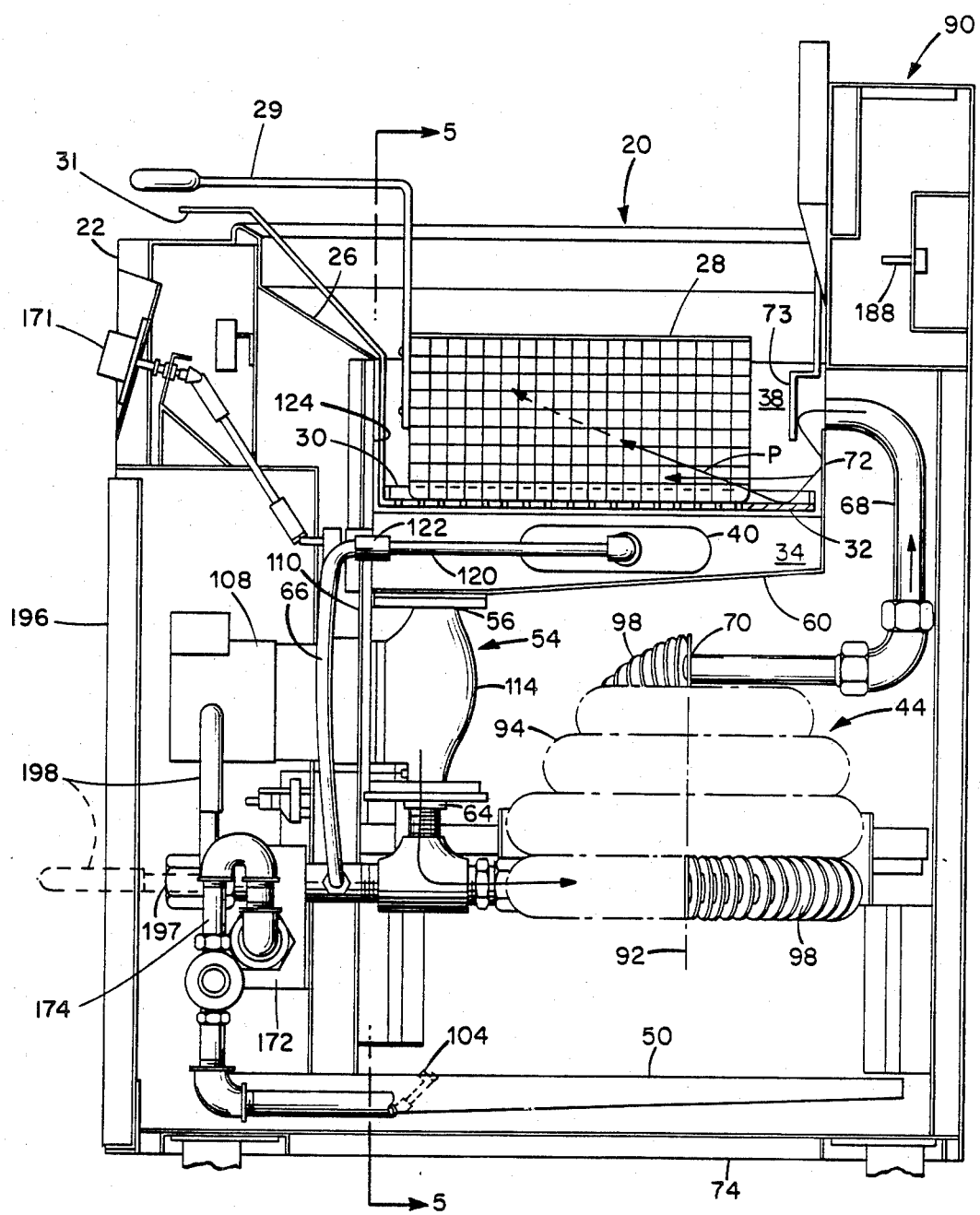
FIG. 4 is a side view, partly in section, of a preferred fryer having a helically-shaped heat exchanger.

The deep fat fryer illustrated in FIGS. 1-5 includes a vessel or fry tank 20 housed within an open-topped cabinet 22. The tank 20 is adapted to hold cooking oil or other cooking liquid (hereafter referred to as "fat") up to a level just below the upper edges of wire baskets or other food holders when essentially full baskets are immersed in the tank 20. Portions of two typical baskets 28 with handles 29 are shown in FIGS. 3 and 4. A crumb tray or grate 30 with a handle 31 divides the fat-holding portion of the tank 20 into a bottom zone 34 and an upper, or fry zone 38 which is unobstructed and of sufficient depth for immersion of food held by the baskets. The bottom of the crumb tray 30 is essentially perforated throughout, except for a deflector portion 32 which diverts downward fat flow both outwardly and upwardly as noted in FIG. 4. The bottom zone 34 carries a filter 40 through which a portion of the fat is continuously circulated as called for by the fryer controls, and as described and claimed in the aforementioned U.S. Pat. No. 4,487,691.

Outside of an preferably below the fry tank 20 are a heat exchanger 44 and a burner 50 which are used to maintain the temperature of the fat at a desired level, such as about 350° F. A pump 54 is connected to the fat-holding portion of the tank 20, for example, by mounting its inlet 56 to the bottom wall 60 of the tank, and is operable to withdraw fat from the tank for circulation through the heating and filtration systems. Between a pump outlet 64 and the tank are two return loops each adapted to return part of the outflow of fat from the pump to the tank. One loop comprises a return pipe 66 connected to the inlet of the filter 40 in the bottom zone 34 of the tank. The other return loop is adapted to direct flow through the heat exchanger 44 and includes a pipe 68 to carry fat from the heat exchanger outlet 70 back to the tank 20. These flow paths, which are in parallel beyond the pump outlet 64, permit filtration of the fat, while cooking, at modest power requirements and avoid the need for immediate shutdown of the fryer in the event of filling and clogging of the filter. The piping through the heat exchanger is relative large in diameter, allowing a relatively unobstructed flow of fat therethrough. The diameter of the return pipe 66 to the filter 40 is relatively small in comparison.

Figure 5:
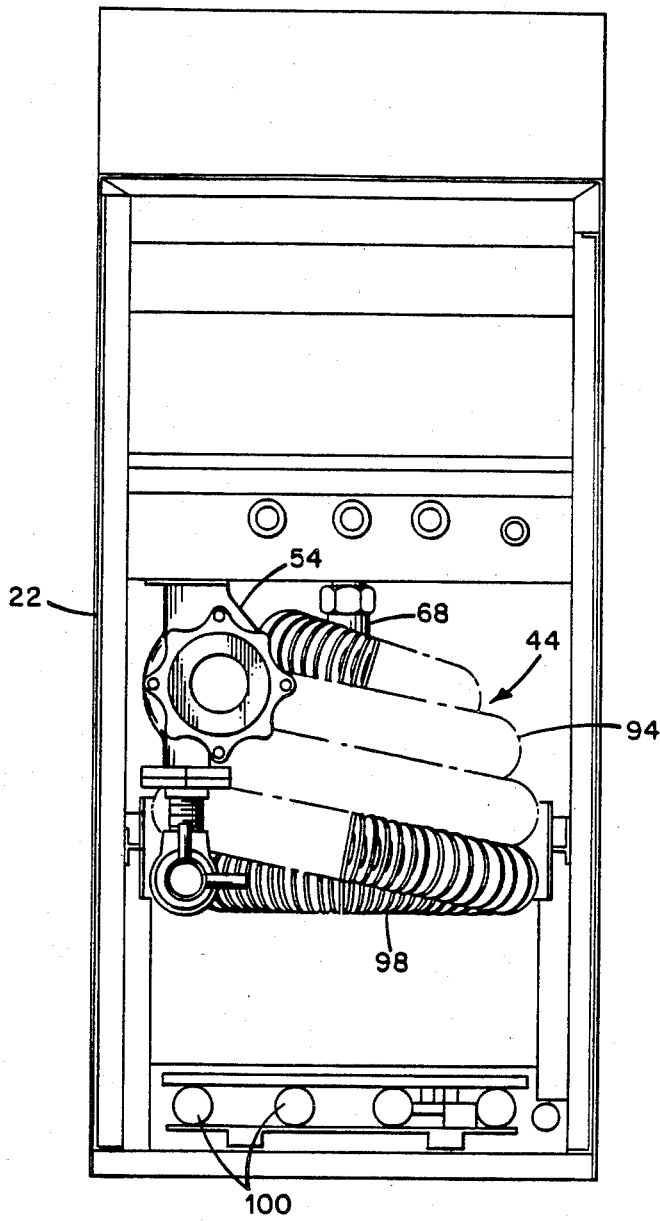
FIG. 5 is a cross-sectional view taken along the line 5—5 of FIG. 4.

As is shown in FIGS. 4 and 5, the pipe 68 which returns fat from the heat exchanger 44 to the fry tank 20 is connected to the rear wall 72 of the tank 20 at an upper, central location so as to discharge fat into the fry zone 38 as a jet directed toward the opposite (front) end of the tank 20. This directional flow and a high flow rate of fat, up to about ten gallons per minute for a fry tank having a working volume of about seven gallons (fifty pounds of fat), provides a jetting action against a deflector 73 and turbulent flow of oil throughout the tank 20. This results in improved and more rapid cooking of foods such as french fries. One observed benefit of the jetting action or forced convection through the baskets has been more uniform frying of foods than with prior art fryers. This permits greater loading of the baskets—up to 7-8 pounds of fries as compared to a typical loading of 5-6 pounds for conventional fryers--without risk of incompletely-cooked fries in the interior or central portions of the baskets. Heated fat is directed through the tank under forced horizontal and vertically downward convection, resulting in a flow pattern P as shown in FIGS. 3 and 4. Additionally, natural vertical convection is always present in hot fat, with hotter liquid rising and cooler descending to further aid the forced convection in performing even and rapid frying. Alternatively, in instances where productivity increase may not be an objective, the forced convection enables lower production with reduced fat temperature. To a degree, depending on the loading of the baskets, the convection can be noticed along the dotted-line extensions of the flow pattern P in FIG. 3, improving circulation of heated fat between the baskets. The end result of this convection is to provide more uniform temperatures of the heated fat than heretofore, resulting in a more uniform cooked product in all portions of the baskets. Also, the jetting action permits cooking at a slightly reduced fat temperature than would otherwise have to be maintained if forced convection were not present. The lower temperature prolongs useful life of the cooking fat, reduces consumption of cooking fuel and produces greater uniformity and evenness of frying.

The deflector 73 is provided near the point of discharge of the pipe 68 to prevent upward components of the turbulent jet flow from causing spattering or spraying of fat from the upper surface of fat held in the tank 20. Strong upward flow components, though not usually present during cooking operation, can occur when moisture becomes mixed with fat circulated through the heat exchanger 44 and forms steam which expands rapidly when the mixture is jetted into the tank through the pipe 68. The deflector 73 may be a rectangular plate extending across a portion of the width of the fry tank 20 and attached to an upper portion of the tank rear wall 72. It acts as a guard to deflect flow horizontally sideways and somewhat downwardly away from the upper surface of the fat. The deflector plate 73 also tends to increase the turbulence and effects the aforementioned forced convection along path P as the main flow of fat is deflected sideways and downward around its edges for passage between and around the outside edges of the two adjacent fryer baskets 28.

Figure 6:
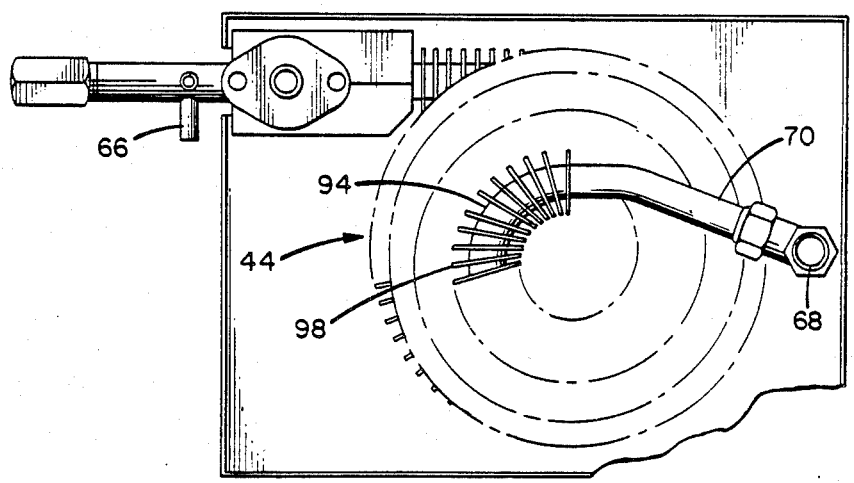
FIG. 6 is a top view of the helically-shaped heat exchanger of the fryer of FIG. 4.

The heat exchanger 44, which is formed in the shape of a helix in the embodiment shown in FIGS. 4-6, is mounted between the tank bottom wall 60 and the burner 50 positioned near the base 74 of the cabinet 22. With this arrangement, upwardly-directed combustion products from the burner 50 pass into contact with outer surfaces of the heat exchanger 44 to heat fat being circulated therethrough by conduction. The combustion products also transfer heat to the fat by contact with the bottom wall 60 and the rear wall 72 of the fry tank 20 as these gases flow toward the exhaust 90 located in the upper rear portion of the fryer.

A preferred heat exchanger 44 is a coiled, helical-shaped tube whose central axis 92 is substantially vertical. The radii of the heat exchanger coils 94 relative to the axis 92 decrease with increasing axial distance from the burner 50 as shown in FIG. 4 in order to expose a maximum amount of surface of the heat exchanger 44 to the combustion products yet permit upward flow of combustion products between its coils. To further promote heat transfer, external fins such as ring-shaped fins 98 may be brazed or otherwise bonded to, or held in good thermal contact with, the outside of the heat exchanger 44 along all or a portion of its length. Suitable material for the fins 98 is a low carbon steel, and a preferred material for the tube forming the heat exchanger coils 94 is stainless steel.

The burner 50 may be a gas-fired pipe burner having one or more pipes 100 (for example, four are shown in FIG. 5) each connected to a manifold 102 and having a row of perforations along its upper portion facing the heat exchanger 44. Atmospheric pipe burners are preferred because of their simplicity, low cost, and quiet operation. The pipe burner 50 does not need a blower to provide air for combustion but instead entrains its combustion air. Also, the burner 50 is compatible with a system which does not require a forced draft fan to remove flue gases from the fryer. A gas pilot 104 is suitable for ignition of the burner 50. Alternatively, a spark igniter may be used.

Withdrawal and circulation of the fat external to the tank is accomplished by means of the pump 54 which may be a centrifugal pump whose inlet 56 is bolted to the tank bottom wall 60. A preferred pump (FIG. 4) has a motor 108 magnetically-coupled to an impeller (not shown) in a housing 114. This permits separation of these components by a heat wall 110 so that although the impeller housing 114 is contacted by combustion products of the burner 50, the pump motor 108 is not exposed to these high temperature gases. It further eliminates the potential of leakage which would be possible around a seal joint if the motor has a shaft directly connected to the impeller.

FIG. 4 shows a filter 40 for removing fat breakdown products and particulate matter from the fat during its circulation. Filtration increases the useful life of the fat, saving costs associated with replacement of the fat, including loss of fryer operating time.

The filter 40, which is positioned in the bottom zone 34 of the tank 20, may (as illustrated herein) have a generally flattened, cylindrical shape. At one end an inlet is provided to receive fat from a conduit 120. The conduit 120 in turn communicates with the return pipe 66 through a fitting 122 which extends through the front wall 124 of the fry tank 20. Since the filtering system is not part of the present invention, further details may be found, it desired, by referring to the previously-referred-to patent.

Under certain frying conditions, such as immediately following immersion of food with high moisture content into the fat held by the fry tank 20, the pump 54 may entrain substantial amounts of water as it withdraws fat from the tank. Unless measures are taken to avoid or accommodate this moisture, vapor lock may occur within the pump 54, reducing the flow of fat through the heat exchanger 44 and the filter 40 to unacceptably low levels. One method of accommodating a vapor lock is to stop and then restart the pump after an automatic shutdown is effected by means of a "low flow" control system as described hereafter. Alternatively, this vapor lock condition may be avoided by limiting the batch size of any high water-content foods cooked in the fryer or temporarily reducing pump speed during their initial cooking when release of moisture is greatest. Entrainment of water may be further reduced by the use of baskets 28 with a solid bottom or plate which blocks release of moisture from the bottom of the baskets into fat below the baskets. Moisture is permitted to flow out of the sides and top of the baskets, areas from which moisture may more easily bubble upward and escape from the fryer as steam.

Use of a properly-designed crumb tray 30 in the fry tank 20 has also been found to help minimize vapor lock of the pump 34 by tending to inhibit migration of moisture from the upper zone 38 of the tank to the bottom zone 34. A crumb tray made from perforated sheet metal having an open area of between 36% and 45% is preferred. The open area must allow sufficient fat flow through the crumb tray to prevent pump starvation, while effectively filtering larger crumbs from the recirculation system.

Figure 7:
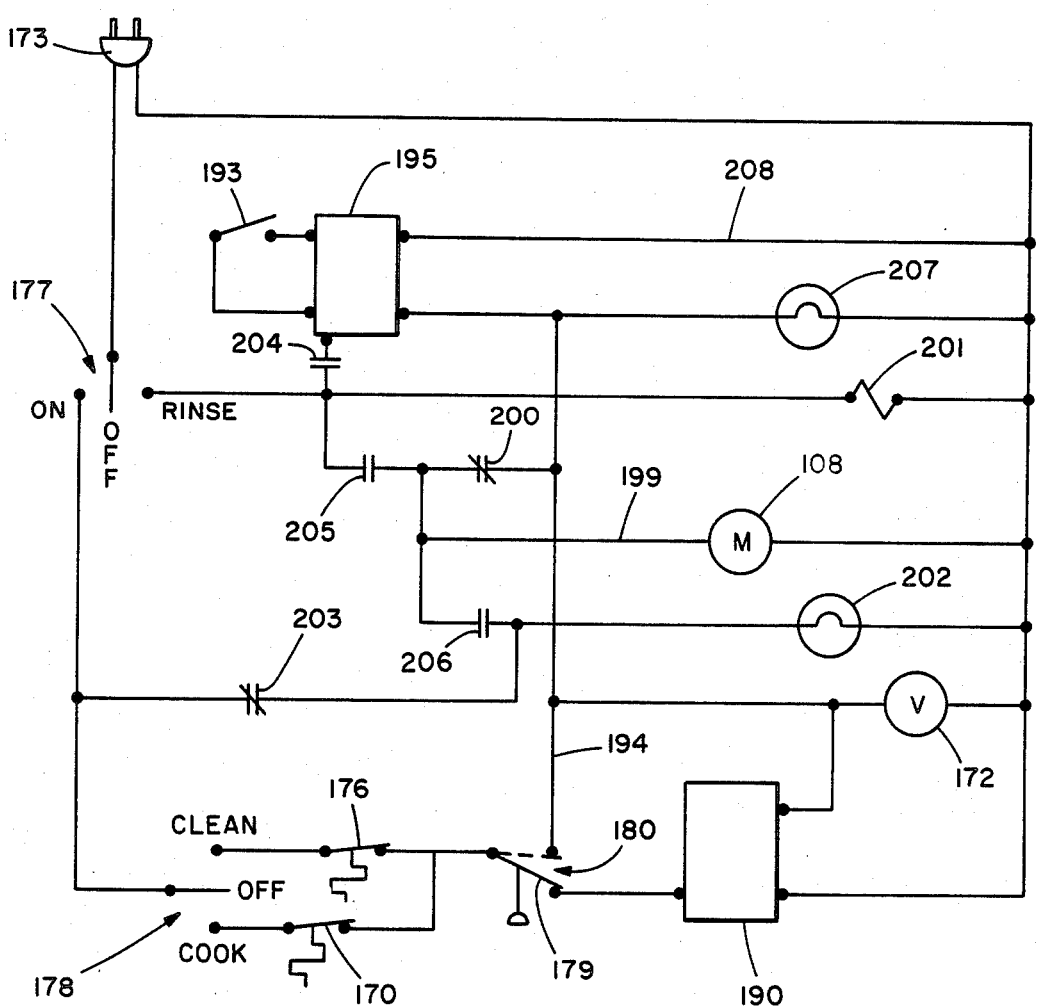
FIG. 7 is a schematic diagram of a preferred form of control system for a fryer according to the invention.

Control of the fryer is achieved by a system having pressure and temperature sensors which control the burner 50 and the pump 54. An electrical schematic of the fryer control system is shown in FIG. 7. FIGS. 2 and 4 show the locations of major elements used in control of the burner and the pump. Included in the system is a cook thermostat 170 which senses temperature of fat in the tank 20 and maintains this temperature at a desired level by regulating a gas valve 172 in a gas line 174 connected to the burner 50. One or more additional thermostats may be provided such as a limit thermostat 175 (FIG. 2) to shut down the burner 50 if the temperature of the fat in the tank 20 exceeds a predetermined level (such as 410° F.), and a "clean mode" thermostat 176 which senses and regulates temperature of a fluid such as a water-based cleaning solution which may be circulated through the fryer during a cleaning cycle. As shown in FIG. 1, the "cook" and "clean" modes of operation may be selected by appropriate manual positioning of rocker switch 178. Switch 178 also has a central "off" position, as noted in FIG. 7.

In addition to the above-described thermostatic controls, a pressure sensor permits operation of the burner 50 only when fat flow through the pump 54 is equal to or greater than a prescribed level. This "low flow" control function is desirable to prevent overheating and rapid breakdown of the fat which would result from continued burner operation at low flow or no flow rates. Such flow conditions can exist during normal start-up of the pump 54, or if a vapor lock occurs in the pump, or if the pump motor fails, or if the heat exchanger 44, the pump 54, or their plumbing becomes blocked for any reason.

Referring specifically now to FIG. 7, let us assume that the fryer is to be started up at the beginning of day and has usable fat remaining in it from the previous day. Preferably, filter 40 will have been removed and the filtering media replaced when the fryer was shut down, so that the operation can commence promptly the next day. Also assume that the remaining life of the fat is approximately one more day or shift and that the system will be cleaned and dried according to the present invention at the end of the period.

If the cook thermostat 170 is left in its position controlled by knob 171 (FIG. 1) from the previous operation, the system can be started by placing the rocker switch 177 in the "on" position and the rocker switch 178 in the "cook" position. Current from the power supply indicated by the electrical plug 173 will flow through the now-closed switches 177 and 178 through the normally closed contacts of a cook thermostat 170, through the normally closed contact 179 of a snap-action pressure-operated switch 180, then through a "burp" timer 190 to energize gas valve 172. Simultaneously through the timer 190, leads 194, 199 and normally-closed contacts 200 of a relay 201, the pump motor 108 is also energized. With fat having been retained overnight in the tank, the heat exchanger 44 will also be full of liquid fat at start-up. Thus, the motor 108 and gas burner 50 will operate simultaneously and will continue to do so, providing another event at the burp timer 190 takes place. Snap-action switch 180 will maintain timer 190 energized and operate the motor 108 and solenoid of valve 172 for a period of three seconds, to enable the pressure operated switch 180 to determine whether liquid is flowing through the system and a predetermined pressure has been built up. Contacts 179 of switch 180 are normally set to snap to their dotted-line position at 4 pounds Hg. pressure. Below that pressure, the contacts will remain in their full-line position of FIG. 7. If the appropriate pressure is reached, contacts 179 will bypass timer 190 and directly maintain motor 108 and the solenoid of valve 172 energized to maintain circulation of the liquid fat and heating of the heat exchanger. In the event pressure switch 180 does not achieve the appropriate indication of flow for any of several reasons, the timer 190 will deenergize the solenoid and motor at the end of three seconds and again energize them again twenty-one seconds later. If, however, everything is in condition for normal operation, movement of contacts 179 to their dotted-line position will cause fat recirculation and heating of the heat exchanger to bring the fat in the tank to the desired temperature as set by the knob 171 for the thermostat 170. Typically, contacts 170 are set to operate within a selected range of 300° F. to 375° F., and will maintain fat temperature within a close tolerance to the selected setting. Once the preset temperature is arrived at, and contacts 170 open, the pump motor 108 will stop and valve 172 will close to shut off the burner, causing contacts 179 to move to their full-line position. When the fat temperature drops to the condition where heat is again called for, contacts 170 again close, and fat recirculation and heating of the heat exchanger will resume as before.

At the time that switch 177 was moved to the "on" condition, the unit illuminated light 202 (FIGS. 1 and 7), indicating that the power was on. Preferably, this is a red light and easily visible across a room. Light 202 will be energized whenever plug 173 is in its outlet and switch 177 is in the "on" position. This takes place through normally-closed contacts 203 of relay 201. Contacts 203 and light 202 are in parallel circuit with the burp timer 190, pump motor 108 and solenoid for valve 172, resulting in the light 202 remaining energized despite the fact that fat recirculation and burner operation may fluctuate between the "on" and "off" conditions as controlled by thermostat 170.

With these conditions and nothing more, the fryer may be used throughout the day and have various periods of non-use as well. During operation of the fryer, if water is entrained into the pump 54, a water or vapor lock may occur, depending upon whether the temperature is being raised to operating temperature, or is already there. Either would result in the failure of liquid fat to be pumped through the heat exchanger 44, causing the pressure-operated switch 180 to drop below the pressure required to maintain continuous operation of pump motor 108 and burner. When contacts 179 snap back to their full-line position of FIG. 7 as a result of pressure drop, burp timer 190 is returned to the condition of three seconds on and twenty-one seconds off. For those first three seconds, recirculation and heating of the heat exchanger will continue to take place. With continued pump vapor lock beyond the three seconds, timer 190 will now turn the motor and valve 172 to their off conditions, stopping recirculation and heating. This allows any steam which may have built up in the pump to drift upwardly through the inlet 156 to bubble to the surface of the fat. After the twenty-one second off period, timer 199 will again commence operation of the motor and valve 172 for three seconds as noted previously at start-up. If the vapor lock still continues at the end of the three seconds, the timer 190 will continue through additional on/off cycles until the vapor lock clears, or the operator notices that the fryer is no longer functioning to cook properly.

What has been described thus far is normally frying operation of the unit. Now, for the subject of this invention, the so-called "dry cycle" operation. At the end of the day or shift, assuming the fat remaining in the tank is to be discarded, the tank 20 and heat exchanger 44 are drained and the filter 40 removed. The manner for accomplishing the latter can be noted from the aforementioned U.S. Pat. No. 4,487,691. Draining first takes place by opening the door 196 at the front and bottom of the unit. The door is hinged vertically at the right-hand corner of FIG. 1. Once the door is open, and before drain valve 197 is moved to the open condition, an appropriate container is placed on the floor in front of the fryer and an extension threaded into the drain valve 197. That extension could be in the form of a nozzle which moves the fat outwardly beyond the valve 197 to a position over the container. A drain handle 198 is then moved from the full-line vertical position of FIG. 4 to a horizontal dotted-line position. That 90° movement opens the valve and permits the tank, heat exchanger, pump and all the tubing connected thereto to drain by gravity into the container.

After draining, the baskets 28 and crumb tray 30 are removed and any crumbs dumped into a waste container. The filter media should now be removed, but a new one should not be installed until the unit has been dried according to this invention. Residue and crumbs on the bottom of the tank should be removed and disposed of. If desired, the buckets and tray may be returned to the tank for partial cleaning in the unit.

The tank is now filled with water to a level above the top of baskets 28 and an appropriate detergent compatible with food operations is added. Switch 178 is moved to the "clean" position to enable the entire system to operate just as it did during cooking, except that now water and detergent will be recirculated. Contacts of the "clean mode" thermostat 176 now maintain operation just as the contacts of the cook thermostat 170 did previously. However, thermostat 176 has a fixed point at approximately 180°–190° F., 20° to 30° F. below the boiling point of the wash water. Recirculation and heating of the water takes place in the same fashion through switch 180 and timer 190 as previously mentioned in connection with the fat. Washing may take place as long as the operator desires, however, 15 or 20 minutes has been found adequate under most circumstances. After washing, the tank and heat exchanger are drained as mentioned previously. At this time, the tank and tubing for the heat exchanger should all be cleaned satisfactorily in preparation for rinsing the subsequent drying of the tubing according to the invention. The baskets 28 and tray 30 can be removed for final cleaning, if needed, and sink rinsing.

At this time, the tank is filled with rinse water. The switch 178 is now moved to the "off" condition and switch 177, which had been "on" during the entire time when either cooking or cleaning were taking place, is now moved through its "off" position to its "rinse" position. Two or more rinses may take place, the next to the last one including vinegar to neutralize any remaining vestiges of soap or cleaning compound. Since the description of one rinse will suffice for all, only the last rinse will be described. Obviously, drain valve 197 should be closed whenever cooking, cleaning or rinsing takes place. This can be readily noticed by the operator approaching the fryer, since the handle 198 for valve 197, if in the horizontal dotted-line position of FIG. 4, will obstruct closing of the door 196 and be in the way of the operator.

When switch 177 is moved to the "rinse" position, relay 201 is immediately energized, opening its normally-closed contacts 200 and 203 and closing its normally open contacts 204, 205 and 206. Closing of contacts 205 and 206 energize motor 108 continuously and cause light 202 to burn continuously during the entire rinse and dry-cycle operation. Although motor 108 recirculates the rinse liquid, burner 55 will not be energized in the preferred embodiment. Therefore, the temperature rinse water that was originally selected will be the temperature at which rinsing takes place.

After the operator is satisfied that appropriate rinsing has taken place, the drain valve 197 is again opened and this time, retained in the open position, preventing closing of the door 196. It has been found that after the tank and heat exchanger have been rinsed, the heat exchanger tubing retains as much as two ounces of water clinging in droplet fashion to the inside walls of the tubing. And there is no way to gain access to the tubing for wiping. Typically, right after draining the final rise, the tank is wiped dry by hand. At this time, the only water that might remain in the system is that between the inlet 56 to the pump and the exit from pipe 68 to the tank. The system is now in condition for the so-called "dry cycle" to commence, by operation of momentary-contact switch 193 shown in FIGS. 1 and 7. Switch 177 is left in the "rinse" position for the "dry" cycle. Since normally-open contacts 204 of relay 201 were closed at the time the rinse operation was commenced, actuation of switch 193 is all that is needed to start operation of a "dry" timer 195. The function of the timer 195 is to pulse the burner 50 periodically. It has been found desirable to operate the burner "on" for 15 seconds and "off" for one full minute. At the end of 6½ minutes, timer 195 times out completely and terminates itself. By virtue of the fact that switch 193 is of the momentary-type, the operator can conveniently walk away after once starting the "dry cycle", and the system will be ready for operation the next day. Timer maintains itself energized for the 6½ minute period through contacts 204 and lead 208. Also, light 207 will be energized whenever the burner is "on", due to its direction electrical connection to the solenoid of valve 172.

As was apparent when contacts 205 of relay 201 were closed during the rinsing operation, motor 108 will be energized continuously throughout the dry cycle. Since steam will be created within the heat exchanger when the burner 50 is energized intermittently, that steam will exit primarily through the pipe 68. Although it is possible to effect drying with the drain valve 197 closed, it is preferred to be maintained open, since it is located at the lowest position of the total system. This permits remaining droplets of water to run out of the heat exchanger by gravity. The dry timer 195, once initially actuated through switch 193 causes valve 172 to open and permit burner 50 to heat the heat exchanger through lead 194. At the same time and actually at any time that the valve 172 is open, light 207 also comes on. The intermittent "pulsing" operation was selected to eliminate the water remaining in the heat exchanger and other inaccessible piping or tubing to be removed, enabling the total system to be ready and in a dry condition when next filling the tank and heat exchanger with fat and commencing a cooking operation. Were that water left in the system, the water or vapor lock which would occur through the initial stages of attempting to heat up the fat would cause an excessively long period of preheating and readying the system for operation. This is particularly true while the fat is cool enough that the water in the pump is not yet hot enough for conversion to steam.

While I have illustrated timers 190 and 195 rather schematically, an understanding of their functions is believed adequate to enable persons skilled in the art to select any of several appropriate timers to accomplish the ends desired.

Having described my invention, I claim:

1. In a deep fat fryer having a tank for holding cooking fat, a fat recirculating system in fluid communication with the tank and comprising tubing located exteriorly of said tank and having an inlet adjacent the bottom of said tank, a return outlet to said tank and a recirculating pump and motor below and adjacent said inlet, said tubing and tank forming a closed-loop path for recirculating fat during cooking and for recirculating cleaning liquid and rinse water during cleaning, a drain valve in said tubing adjacent a lowermost portion thereof for draining said tank and tubing, a heat exchanger encompassing a portion of said tubing, a burner for delivering heat to said heat exchanger and thereby to liquid in said tubing, and control means including thermostatic means for controlling said pump motor and burner to an activated condition during cooking to supply heated fat to said tank and to maintain the fat therein at a preselected cooking temperature and to a deactivated condition when said cooking temperature has been reached, the improvement comprising:

means for removing essentially all residual rinse water remaining in said tubing after fat has been drained and after cleaning liquid and rinse water have been placed in said tank in succession, circulated and drained through said drain valve, said water-removing means including timer means for alternately activating and deactivating said burner to first heat the heat exchanger for converting water droplets in said tubing into steam to enable the escape of said steam from said tubing and to then allow the heat exchanger to cool, the time periods of activation and deactivation of said burner being selected to sufficiently raise the temperature of water droplets in the tubing to convert them into steam without overheating the heat exchanger, means for energizing said timer means, and means for disabling said energizing means after a time period corresponding to the time required to essentially dry said tubing.

2. A deep fat fryer according to claim 1 wherein said drain valve is manually-operable and is maintained in its open, draining condition during the period said timer means is energized, whereby primary water droplet escape from the tubing may take place through said open valve.

3. A deep fat fryer according to claim 2 wherein the timer energizing means is operatively connected to said pump motor to provide air flow through said tubing throughout the drying period.

4. A deep fat fryer according to claim 1 wherein said time period exceeds five minutes.

5. A deep fat fryer according to claim 4 wherein said burner is a gas burner and wherein the time of each activation of said burner while under control of said timer means is in the order of fifteen seconds.

6. A deep fat fryer according to claim 5 wherein the total deactivation time of the burner while under control of said timer means is at least five times as great as the total activation period.

7. In a deep fat fryer having a tank for holding cooking fat, a fat recirculating system in fluid communication with the tank and comprising tubing located exteriorly of said tank and having an inlet adjacent the bottom of said tank, a return outlet to said tank and a recirculating pump and motor below and adjacent said inlet, said tubing and tank forming a closed-loop path for recirculating fat during cooking and cleaning liquid and rinse water and during cleaning, a drain valve in said tubing adjacent a lowermost portion thereof for draining said tank and tubing, a heat exchanger encompassing a portion of said tubing, a burner for delivering heat to said heat exchanger and thereby to liquid in said tubing, and control means including thermostatic means for controlling said pump motor and burner to an activated condition during cooking to supply heated fat to said tank and to maintain the fat therein at a preselected cooking temperature and to a deactivated condition when said cooking temperature has been reached, the improvement comprising:

second control means for cleaning, rinsing and drying said tank and tubing after fat has been removed therefrom, including a. first switch means and circuitry for energizing said pump motor and operating said burner during circulation of a cleaning liquid, b. a thermostat for maintaining liquid at a predetermined temperature below the boiling point of water during cleaning fluid recirculation,
c. a second switch and circuitry for energizing said pump motor independently of said burner during circulation of rinse water after said cleaning fluid has been drained,
d. a timer for alternately activating and deactivating said burner to dry water droplets contained in said tubing after said rinse fluid has been removed, and
e. third switch means for energizing said timer, and means for maintaining said timer energized for a time period corresponding to the time required to essentially dry said tubing.

8. A deep fat fryer according to claim 7 wherein each activation period of said burner under control of said timer is in the order of fifteen seconds.

9. A deep fat fryer according to claim 7 wherein the timer is activated for a period in the order of six to seven minutes.

10. A deep fat fryer according to claim 7 wherein said second and third switches are connected in series to said timer, but said timer and pump motor are in parallel, whereby said pump motor is continuously energized while said timer alternately activates and deactivates said burner.

11. A deep fat fryer according to claim 10 wherein said drain valve is maintained in an open condition throughout the period of drying, for enabling air flow to cause water droplets and steam to escape from said tubing.

12. A deep fat fryer according to claim 10 wherein said third switch is a momentary contact switch, and wherein said timer includes hold-in circuitry to maintain said timer active for a drying period.

13. The method of operating a deep fat fryer having a tank for holding cooking fat, a fat recirculating system in fluid communication with the tank and comprising tubing located exteriorly of said tank and having an inlet adjacent the bottom of said tank, a return outlet to said tank and a recirculating pump and motor below and adjacent said inlet, said tubing and tank forming a closed-loop path for recirculating fat during cooking and cleaning liquid and rinse water during cleaning, a drain valve in said tubing adjacent a lowermost portion thereof for draining said tank and tubing, a heat exchanger encompassing a portion of said tubing, a burner for delivering heat to said heat exchanger and thereby to liquid in said tubing, and first control means including thermostatic means for controlling said pump motor and burner to an activated condition during cooking to supply heated fat to said tank to maintain the fat therein at a preselected cooking temperature and to a deactivated condition when said cooking temperature has been reached, said method comprising:

draining the fat from the tank and tubing through said drain valve, filling the tank and tubing with a cleaning liquid, and recirculating and draining said cleaning liquid, filling the tank and tubing with rinse water, and recirculating, heating, and finally draining the rinse water therefrom, the improvement consisting of:

thereafter intermittently activating and deactivating said burner for a time period to convert water droplets in said tubing into steam for escape therefrom to dry said tubing internally, and discontinuing burner operation after a time period corresponding to the normal time period required to dry said tubing.

14. The method according to claim 13 wherein said drain valve is maintained open for the period of intermittent operation of said burner for drying said tubing.

15. The method according to claim 14 including the step of energizing said pump motor while drying said tubing to cause air flow to assist escape of steam and water droplets through said drain valve.

16. The method according to claim 13 wherein each activated condition of the burner during intermittent operation is in the order of fifteen seconds and wherein each deactivated period is substantially greater than each activated period.

17. The method according to claim 13 wherein the time period of intermittent activation of said burner is determined according to the required time to essentially dry said tubing.

* * * * *